United States Patent [19]
Yoshida et al.

[11] Patent Number: 5,291,573
[45] Date of Patent: Mar. 1, 1994

[54] OPTICAL FIBER CABLE WOUND ABOUT OVERHEAD POWER TRANSMISSION LINE

[75] Inventors: Satoru Yoshida; Masami Obara, both of Tokyo, Japan

[73] Assignee: The Furukawa Electric Co., Ltd., Tokyo, Japan

[21] Appl. No.: 975,696

[22] Filed: Nov. 13, 1992

[30] Foreign Application Priority Data

Nov. 19, 1991 [JP] Japan ............... 3-102927[U]

[51] Int. Cl.$^5$ ............................................. G02B 6/44
[52] U.S. Cl. ................................................ 385/103
[58] Field of Search ........................ 385/100, 103, 104

[56] References Cited

U.S. PATENT DOCUMENTS

| | | | |
|---|---|---|---|
| 3,883,218 | 5/1975 | Slaughter | 385/103 |
| 3,937,559 | 2/1976 | Ferrentino et al. | 385/100 |
| 4,185,887 | 1/1980 | Ferrentino | 385/100 |
| 4,226,504 | 10/1980 | Bellino | 385/104 |
| 4,515,435 | 5/1985 | Anderson | 385/103 |
| 4,840,453 | 6/1989 | Kitayama | 385/104 |

OTHER PUBLICATIONS

IEEE Region 10 Conference on Computer and Communication Systems (IEEE Tencon '90) Sep. 1990, Hong Kong, pp. 788-792, Murata H "Application of Optical Communications for Power Distribution Companies".
Patent Abstracts of Japan, vol. 14, No. 11 (P-988) Jan. 11, 1990 & JP-A-12 60 407 (Furukawa).
Patent Abstracts of Japan, vol. 11, No. 386 Dec. 17, 1987 & JP-A-62 153 803 (Chuba Electric Power).

*Primary Examiner*—Akm E. Ullah
*Attorney, Agent, or Firm*—Frishauf, Holtz, Goodman & Woodward

[57] ABSTRACT

A optical fiber cable wound about an overhead transmission line stretched between supporting poles installed a predetermined distance apart from each other, comprises a tension member, a plurality of plural-core type optical fiber tape-shaped strands arranged on the outside of the tension member, a buffer layer covering outer surface of the arrangement of the plural-core type optical fiber tape-shaped strands, and a sheath covering the outer surface of the buffer layer. The tape-shaped strands each include a plurality of optical fibers arranged side by side, and a covering layer collectively covering the plurality of side by side optical fibers. The particular construction permits the optical fiber cable to house a larger number of optical fibers for a given diameter of the cable while maintaining a high heat resistance and satisfactory mechanical properties.

15 Claims, 2 Drawing Sheets

OPTICAL FIBER CABLE WOUND ABOUT OVERHEAD POWER TRANSMISSION LINE

BACKGROUND OF THE INVENTION

1. Field of the Invention

The present invention relates to an optical fiber cable wound about an overhead transmission line for transmitting power of high voltage, said optical fiber cable being used for optical communication or the like.

2. Description of the Related Art

An optical fiber is not electrically affected by a power line such as a transmission line. Based on this property, an optical fiber cable B wound about an overhead transmission line A installed in advance has been developed as shown in FIG. 1 to permit communication between, for example, a power station and a substation.

The optical fiber cable B wound about the overhead transmission line A is required to meet the conditions described below. First of all, the optical fiber cable is heated by the heat generated from the overhead transmission line itself. In, particularly, the summer season, the overhead transmission line is heated to temperatures exceeding 100° C. in some cases, with the result that the optical fiber cable is also heated to about 100° C. If an accident occurs by short-circuiting in the overhead transmission line, the optical fiber cable is momentarily heated to about 300° C. Naturally, the optical fiber cable wound about the overhead transmission line is required to exhibit a high heat resistance, i.e., resistance to about 300° C.

It should also be noted that an overhead transmission line is stretched between supporting poles installed a predetermined distance apart from each other and, thus, receives a very high wind pressure. Naturally, it is important for the optical fiber cable wound about the overhead transmission line to have an outer diameter as small as possible. To be more specific, the outer diameter of the optical fiber cable should be at most about 5 mm.

A conventional optical fiber cable constructed to meet the two requirements described above has a cross section as shown in FIG. 3. It is seen that a plurality of single-core type optical fiber strands 16, each having a covering, are arranged about the outer surface of a tension member 1, made of, for example, FRP (Fiber Reinforced Plastic). Further, the optical fiber strands 16 are covered with a fluoroplastic sheath (protective layer) 17. FIG. 2 shows the construction of the single-core type optical fiber strand 16. Specifically, the strand 16 comprises an optical fiber 13 consisting of a core 11 and a clad 12 each formed of silica glass, a buffer layer 14 made of, for example, a silicone resin and positioned to cover the optical fiber 13, and an outermost layer 15 made of, for example, a fluoroplastic and positioned to cover the buffer layer 14.

In the conventional optical fiber cable described above, the outermost layer 15 of the single-core type optical fiber strand 16 is made of a fluoroplastic. Since the fluoroplastic outermost layer 15 is hard and permits sufficiently protecting the optical fiber 13, it is unnecessary to provide a buffer layer made of, for example, a silicone resin to cover the outer surface of the tension member 1. However, in the case of preparing an optical fiber cable having an outer diameter of about 5 mm by using the single-core type optical fiber strands 16, only about 12 strands can be incorporated in the optical fiber cable. An optical fiber cable having only about 12 single-core type optical fiber strands incorporated therein is incapable of handling an increase in data expected in the future. In other words, the optical fiber cable is incapable of transmitting a large amount of optical signals.

For enabling the optical fiber cable to be capable of transmitting a large amount of optical signals, it is certainly possible to incorporate a larger number of the single-core type optical fiber strands 16 by diminishing the outer diameter of each of the strands 16. As a matter of fact, the outer diameter of the strand 16 can be diminished by decreasing the thickness of the outermost layer 15 of the strand 16. It is also possible to diminish the outer diameter of the optical fiber cable by decreasing the thickness of the protective layer 17 to permit the cable of a predetermined thickness to include a larger number of the single-core type optical fiber strands 16. If the thickness of the outermost layer 15 or the protective layer 17 is decreased, however, the optical fiber cable fails to exhibit a sufficient heat resistance and satisfactory mechanical properties such as tensile strength and so on.

SUMMARY OF THE INVENTION

An object of the present invention is to provide an optical fiber cable wound about an overhead transmission line, the optical fiber cable being capable of housing a larger number of optical fiber strands and exhibiting high heat resistance and good mechanical properties.

According to the present invention, there is provided an optical fiber cable wound about an overhead transmission line stretched between supporting poles installed a predetermined distance apart from each other, the optical fiber cable having a tension member, a plurality of plural-core type optical fiber tape-shaped strands arranged on the outside of the tension member, a buffer layer covering the outer surface of the arrangement of the plural-core type optical fiber tape-shaped strands, and a sheath covering the outer surface of the buffer layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 4:
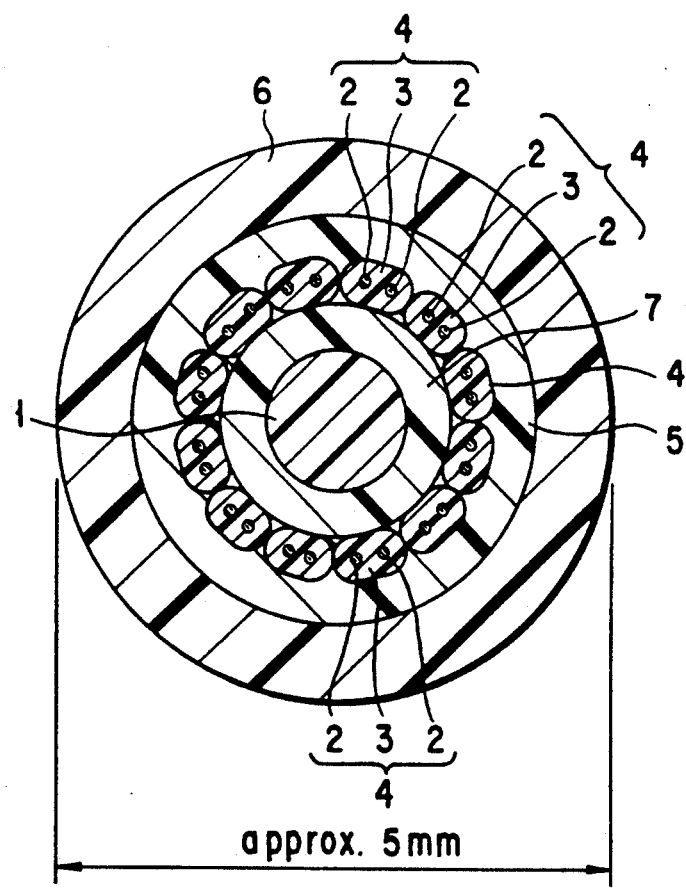
FIG. 4 is a cross sectional view showing an optical fiber cable according to one embodiment of the present invention, said cable being wound about an overhead transmission line.

An optical fiber cable according to one embodiment of the present invention is constructed, for example, as shown in FIG. 4. The cable comprises a tension member 1 made of, for example, FRP. A buffer cover layer 7 made of a silicone resin, a fluoride resin, etc. is formed, as required, to cover the outer surface of the tension member 1. The buffer cover layer 7 makes it possible to improve a tensile strength of the optical fiber cable. It is possible to omit the buffer cover layer 7. In this case, the tension member 1 can be enlarged to have a diameter equal to the outer diameter of the buffer cover layer 7.

Arranged to cover the outer circumferential surface of the buffer cover layer 7 are 12 double-core type optical fiber tape-shaped (hereinafter "tape") strands 4. In this embodiment, 24 optical fibers are included in the optical fiber cable. These double-core type optical fiber tape strands 4 are arranged such that the adjacent strands 4 are in mutual contact. The strand 4 comprises two optical fibers 2 each comprising a core and a clad and a thin covering layer 3 covering these two optical fibers. Each of the core and the clad of the optical fiber 2 is made of silica glass. In preparing the strand 4, two optical fibers 2 are arranged side by side and, then, collectively (i.e., commonly) covered with a heat resistant resin such as an UV-curing type acrylic resin or a fluoride resin to form the covering layer 3. The double-core type optical fiber strand 4 is sized, for example, at 0.65 mm in width and 0.4 mm in height.

A buffer layer 5 made of a heat resistant resin such as a silicone resin or a fluoride resin is formed to cover the outer surface of the double-core type optical fiber tape strands 4. The buffer layer 5 serves to relax stress by external pressure. Further, a sheath (protective layer) 6 made of a heat resistant resin such as a fluoride resin is formed to cover the outer surface of the buffer layer 5.

Figure 1:
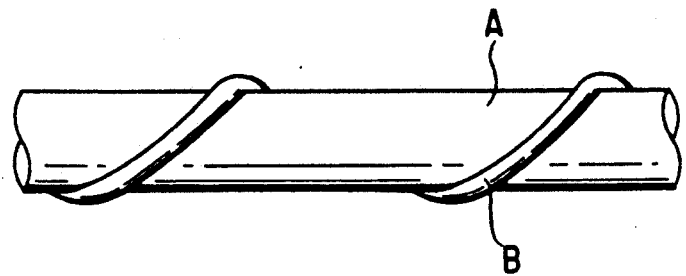
FIG. 1 shows how an optical fiber cable is wound about an overhead transmission line.
Figure 2:
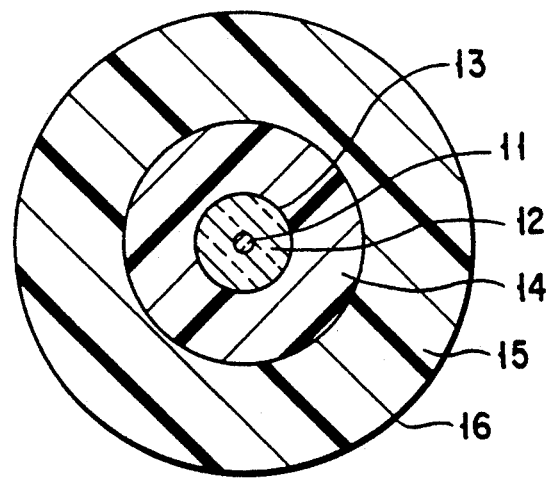
FIG. 2 is a cross sectional view exemplifying an optical fiber strand included in a conventional optical fiber cable wound about an overhead transmission line.
Figure 3:
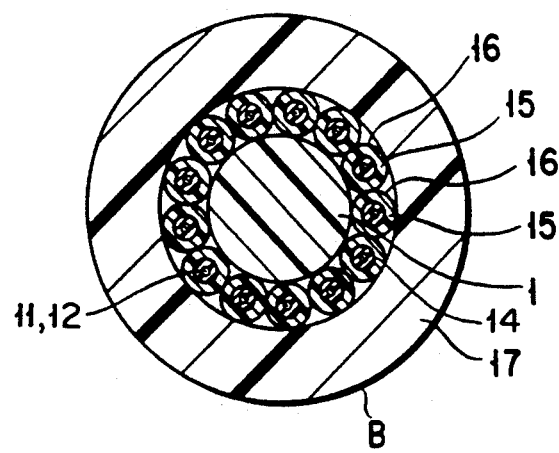
FIG. 3 is a cross sectional view showing a conventional optical fiber cable wound about an overhead transmission line.

In the optical fiber cable of the present invention constructed as described above, two optical fibers 2 arranged side by side are collectively covered with a resin to provide the double-core type optical fiber tape strand 4. In the prior art, however, single-core type optical fiber strands 16 each constructed as shown in FIG. 2 are arranged in mutual contact to surround the outer surface of the tension member 1, as shown in FIG. 3. What should be noted is that the width of the double-core type optical fiber tape strand 4 is much smaller than that of two single-core type optical fiber strands 16. That is to say, the width of the strand 4 (present invention) per single optical fiber is much smaller than that of the strand 16 (prior art) per single optical fiber. It follows that the particular construction of the present invention makes it possible to increase the number of optical fibers which can be arranged around the outer circumferential surface of the tension member 1 of the same diameter. Naturally, the optical fiber cable of the present invention, which is wound about an overhead power transmission line, permits markedly increasing the amount of optical signals which can be transmitted. Incidentally, the optical fiber cable of the present invention can be wound, for example, spirally about an overhead transmission line.

It has been found possible to diminish the outer diameter of an optical fiber cable of the present invention, which included 24 optical fibers 2, to about 5 mm, which is smaller by about 15% than the outer diameter of a conventional optical fiber cable constructed as shown in FIG. 3, which included 24 optical fibers. Further, the optical fiber cable of the present invention has been found fully comparable with the conventional optical fiber cable in heat resistance and tensile strength and so on.

On the other hand, the conventional optical fiber cable shown in FIG. 3 has been found to be capable of housing only 12 single-core type optical fiber strands where the outer diameter of the cable was defined to be 5 mm. Likewise, where 24 single-core type optical fiber strands 16 having the outer diameter of 0.4 mm were arranged to cover the outer circumferential surface of the tension member 1 in the conventional optical fiber cable shown in FIG. 3, the outer diameter of the resultant cable has been found to be as large as about 5.9 mm.

A double-core type optical fiber tape strand 4 is used in the embodiment of the present invention described above. Needless to say, it is also possible in the present invention to use an optical fiber tape housing 3 or more optical fibers, depending on the required upper limit in the outer diameter of the optical fiber cable. In other words, the number of optical fibers arranged to surround the tension member can be determined appropriately in the present invention.

As described above, the present invention provides an optical fiber cable wound about an overhead transmission line. In the optical fiber cable of the present invention, plural-core type optical fiber tape strands are arranged about the outer circumferential surface of a tension member. The particular construction makes it possible to increase the number of optical fibers housed in a cable of a predetermined outer diameter so as to increase the amount of optical signals which can be transmitted. In addition, the outer diameter of the cable can be diminished, resulting in reduction in the air pressure received by the cable.

What should also be noted is that the optical fiber cable of the present invention comprises a sufficiently thick covering layer covering the optical fibers. It follows that the cable of the present invention exhibits a sufficiently high heat resistance and satisfactory mechanical properties such a tensile strength.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical fiber cable wound about an overhead transmission line, said optical fiber cable comprising:
   a tension member;
   a plurality of plural-core type optical fiber tape-shaped strands arranged on the outside of said tension member
   said plural-core type optical fiber tape-shaped strands each comprising a plurality of optical fibers arranged side by side, and a covering layer collectively covering said plurality of optical fibers;
   a buffer layer covering the outer surface of the arrangement of the plural-core type optical fiber tape-shaped strands; and a sheath covering the outer surface of the buffer layer.

2. The optical fiber cable according to claim 1, which is wound spirally about a transmission line.

3. The optical fiber cable according to claim 1, wherein said plural-core type optical fiber tape-shaped strands are arranged side-by-side in parallel and in direct contact with each other on the outer circumferential surface of said tension member.

4. The optical fiber cable according to claim 1, wherein said covering layer of said plural-core type optical fiber tape-shaped strands is formed of a heat resistant resin.

5. The optical fiber cable according to claim 4, wherein said heat resistant resin is selected from the group consisting of an UV-curing type acrylic resin and a fluoride resin.

6. The optical fiber cable according to claim 1, wherein said tension member is made of a fiber reinforced plastic material.

7. The optical fiber cable according to claim 1, further comprising a further buffer layer covering said tension member.

8. The optical fiber cable according to claim 1, wherein each said optical fiber tape-shaped strand is of a double-core type.

9. The optical fiber cable according to claim 1, wherein said buffer layer covering the outer surface of said optical fiber tape-shaped strands is made of a heat resistant resin.

10. The optical fiber cable according to claim 9, wherein said heat resistant resin is selected from the group consisting of silicone resin, and fluoride resin.

11. The optical fiber cable according to claim 1, wherein said sheath is made of a heat resistant material.

12. The optical fiber cable according to claim 11, wherein said heat resistant resin is fluoride resin.

13. The optical fiber cable according to claim 1, wherein said plural-core type optical fiber tape strands each comprise at least two of said optical fibers arranged side by side in parallel, and which are commonly covered by said covering layer.

14. The optical fiber cable according to claim 1, wherein said plural-core type optical fiber tape strands have substantially flat surfaces between side edges thereof, as seen in cross-section.

15. The optical fiber cable according to claim 1, wherein said plural-core type optical fiber tape strands have a greater width than height in cross section.

* * * * *